3,346,650
PREPARATION OF CITRONELLOL
Bernard J. Kane, Atlantic Beach, Fla., assignor to The Glidden Company, Cleveland, Ohio, a corporation of Ohio
No Drawing. Filed Mar. 22, 1965, Ser. No. 441,854
7 Claims. (Cl. 260—631.5)

The present invention relates to the preparation of citronellol and particularly relates to its preparation from geraniol and/or nerol.

French Patent 1,316,192 described the catalytic hydrogenation of a mixture of citronellol and geraniol to increase the amount of citronellol. The catalysts disclosed are Raney nickel, Raney cobalt and palladium on carbon. In the hydrogenation of such material by the prior art procedures it is difficult to prevent the further hydrogenation of the citronellol to dimethyloctanol (DMO). Ordinarily such hydrogenations will give a maximum of 65 to 75% citronellol.

United States Patent 2,066,496 described the general process for the reduction of olefinic double bonds by heating compounds containing the same in the presence of a hydrogenation catalyst with primary or secondary alcohols as the source of hydrogen.

Citronellol is valuable as a constituent of perfumes, but present-day formulators prefer citronellol which is as low as possible in dimethyl-octanol content because of its off-odor and accordingly citronellol containing appreciable quantities of this saturated alcohol are of little organoleptic value. Since the saturated alcohol is not readily separated from the citronellol it is desirable to suppress its formation as much as possible.

It is accordingly an object of the present invention to provide an improved process for producing citronellol. Another object is to provide a novel process for producing citronellol from geraniol and/or nerol. A further object is to provide a process for producing citronellol having a low content of dimethyl octanol.

It has been found that the foregoing objects can be accomplished if the hydrogenation is carried out using copper chromite as the hydrogenation catalyst. The source of hydrogen can be either molecular hydrogen or an alcohol, preferably a primary or a secondary alcohol which provides hydrogen under the conditions of the reaction. The use of an alcohol to provide all or part of the hydrogen has the advantage that it reduces the amount of hydrocarbons formed during the reaction. The preferred alcohol is isopropanol and when it is used in excess as the sole source of hydrogen there is substantially no hydrocarbon formation. In any event, the use of the copper chromite as the catalyst materially reduces the amount of dimethyl-octanol. The formation of hydrocarbons, while leading to some losses in yields, is not harmful to the purity of the product since it is readily separated therefrom.

The temperature range at which the reaction is carried out is between 150° C. to about 240° C., with a preferred range of about 180° C. to 190° C. when using isopropanol. When using molecular hydrogen as the sole source of hydrogen the hydrocarbon formation can be reduced by carrying out the hydrogenation at the higher temperatures within the range. The reaction preferably is stopped when all or substantially all of the starting dienol has been consumed. This can be easily determined by infrared spectroscopy or by vapor phase chromatography. The time may vary from a few minutes (5) to several hours (6), but a time of about 1 to 2 hours is preferred. Continued treatment leads to increased secondary reaction products.

The reaction can be carried out in the absence of any added hydrogen, the hydrogen necessary for the hydrogenation of the dieneol being provided substantially solely by the alcohol, preferably isopropanol, which is preferably used in excess. The pressures involved may be varied over a considerable range but it is preferred to carry out the reaction in the liquid phase and the autogeneous pressure obtained when the reaction is carried out in an autoclave is suitable.

The reaction product is composed predominately of citronellol but may contain small but varying amounts of dimethyloctanol, citronellal and isopulegol. The dimethyloctano, citronellal and isopulegol are secondary reaction products, but under the conditions employed in the invention their production is held to a minimum. The following series of equations illustrate these reactions:

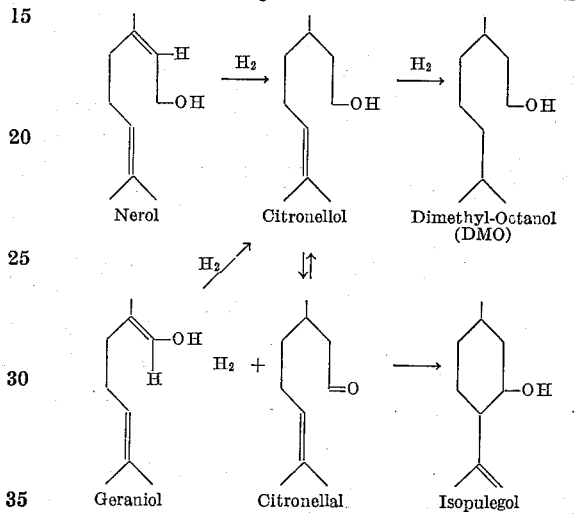

Nerol      Citronellol      Dimethyl-Octanol (DMO)

Geraniol      Citronellal      Isopulegol

It will be noted from these equations that the initial hydrogenation is preferential for the allylic double bond. Also, under the conditions of the reaction, the hydrogenation is quite selective in that little or no conversion of citronellol to dimethyl-octanol takes place.

Also, under the preferred conditions of the invention, there is little or no dehydrogenation of the citronellol to citronellal. This is probably due in large part to the fact that the isopropanol is present in excess, but applicant does not want to be bound by this theory.

Other products which are formed in the reaction are hydrocarbons due to hydrogenolysis. This reaction, however, is suppressed by the use of an alcohol, particularly isopropanol, as the source of hydrogen rather than gaseous hydrogen. Also the reverse reaction resulting from the reduction of the carbonyl by-product, particularly acetone, formed initially may account for some of the reduced hydrocarbon formation.

It is preferred to use about 3.6 moles of isopropanol per mole of octadienol as the hydrogen source. The dehydrogenation of the isopropanol is endothermic and the hydrogenation of the citronellol is exothermic, the amount of heat produced by the hydrogenation being about equal to that required for the dehydrogenation. It is accordingly very easy to maintain fairly stable temperature conditions for the reaction.

Other alcohols providing hydrogen under the conditions of the reaction can be employed but isopropanol is the best one I have found.

Any suitable copper chromite catalyst can be employed. It is preferred to use a barium-promoted copper chromite catalyst, and the one which has been found to be most suitable is one which contains by analysis about 42% copper oxide, 42% chromic oxide and 12% barium oxide, balance inert. The following examples illustrate the invention.

Example I (a) 154 parts (1 mole) of a mixture of 83% geraniol and 17% nerol was heated in an autoclave with 216 parts (3.6 moles) of isopropanol and 7.5 parts of a barium promoted copper chromite catalyst for 1.5 hours at 180° C. in liquid phase under autogenous pressures of 250-300 p.s.i.g. in the absence of any added hydrogen.

(b) The conditions were the same as in (a) next above except that only 60 parts (1 mole) of isopropanol was used and hydrogen was added to the autoclave.

(c) 300 parts of a mixture of 83% geraniol and 17% nerol and 15 parts of the same barium promoted catalyst used above was heated in an autoclave without any added alcohol but with added hydrogen at a temperature of 180-190° C. and at a pressure of 400-500 p.s.i.g. for one hour.

The reaction mixtures from the previous experiments were analyzed by vapor phase chromatography and the results are shown in Table I.

TABLE I

| Source Hydrogen | P.s.i.g. | Time, hr. | HC Percent | DMO Percent | Citronellal Plus Isopulegol, Percent | Citronellol, Percent | Geraniol Plus Nerol, Percent |
|---|---|---|---|---|---|---|---|
| 3.6 moles isopropanol | 250-300 | 1.5 | 1.6 | 1.6 | 2.4 | 90.4 | 4.4 |
| 1 mole isopropanol Plus $H_2$ | 250-300 | 1.5 | 8.9 | 0.8 | 0.0 | 82.5 | 7.7 |
| $H_2$ | 400-500 | 1.0 | 9.5 | 3.3 | 0.0 | 82.4 | 4.8 |

Example II 3.6 moles of various alcohols were heated in an autoclave with 1 mole quantities of the 83/17 mixture of geraniol and nerol used in Example I in the presence of 5% by weight of the barium promoted copper chromite catalyst for varied periods of time at 180° C.-190° C. under autogenous pressures without added hydrogen. The results were as shown in Table II.

TABLE II

| Alcohol | P.s.i.g. | Time, Hrs. | HC, Percent | DMO, Percent | Citronellal Plus Isopulegol, Percent | Citronellol, Percent | Geraniol Plus Nerol, Percent |
|---|---|---|---|---|---|---|---|
| Cyclohexanol | 60 | 3.0 | 1.1 | 1.1 | 18.9 | 78.9 | 0.0 |
| Methanol | 280-300 | 5.0 | 0.0 | 7.2 | 21.3 | 64.7 | 6.8 |
| 2-butanol | 130 | 4.0 | 0.0 | 6.9 | 28.4 | 57.8 | 6.9 |
| Ethanol | 320 | 6.0 | 0.0 | 0.0 | 8.7 | 4.0 | 87.3 |

Example III 3.6 moles of various solvents were heated in an autoclave with 1 mole of the 83/17 mixture of geraniol and nerol and 7.5 parts by weight of the barium promoted catalyst at 180-190° C. in the presence of added hydrogen at various pressures for various times. The results were as shown in Table III.

TABLE III

| Solvent | P.s.i.g. | Time, Hrs. | HC, Percent | DMO, Percent | Citronellal Plus Isopulegol, Percent | Citronellol, Percent | Geraniol Plus Nerol, Percent |
|---|---|---|---|---|---|---|---|
| Benzene | 400-500 | 2.0 | 16.0 | 3.2 | 0.0 | 73.6 | 7.2 |
| Heptane | 300-400 | 2.0 | 19.1 | 11.8 | 0.0 | 69.1 | 0.0 |
| 2-butanol | 350-400 | 1.0 | 13.3 | 0.0 | 0.0 | 86.7 | 0.0 |
| Cyclohexanol | 300-400 | 1.0 | 8.8 | 0.0 | 0.0 | 89.0 | 2.2 |

Example IV

Two moles (aliquots) of the 83/17 mixtures of geraniol and nerol was heated with 5% of the copper chromite catalyst used in the previous examples in an autoclave at various temperatures in the presence of added hydrogen at various pressures, but in the absence of any solvent, for various periods of time. The conditions and results are shown in Table III and Table IV and Examples V and VI.

TABLE IV

| Temp., °C. | P.s.i.g. | Time | HC Percent | DMO Percent | Citronellal Plus Isopulegol, Percent | Citronellol, Percent | Geraniol Plus Nerol, Percent |
|---|---|---|---|---|---|---|---|
| 125-130 | 200-300 | 51 hrs | 26.2 | 3.4 | 0.0 | 58.5 | 12.0 |
| 180-190 [1] | 400-500 | 1 hr | 9.5 | 3.3 | 0.0 | 82.4 | 4.8 |
| 190-200 | 300-500 | ½ hr | 6.3 | 2.6 | 0.0 | 88.5 | 2.6 |
| 240 | 300-600 | 5 min | 4.3 | 2.8 | 0.9 | 90.2 | 1.8 |

[1] Same as Example I(c).

Example V 500 parts of the 83/17% geraniol/nerol mixture and 23 parts of the same copper chromite catalyst were heated with 0.5 part of KOH in an autoclave under a hydrogen pressure of 350-400 p.s.i.g. at 210-220° C. for one and one-half hours and the reaction product analyzed as follows: hydrocarbons 1.5%; DMO 3.0%; citronellol 91.7% and 3.8% geraniol/nerol.

Example VI 500 parts of an 83/17 mixture of geraniol and nerol and 15 parts of a Raney nickel type catalyst were heated in an autoclave without any added alcohol but with added hydrogen at a temperature of 40-50° C. and a pressure of 300-400 p.s.i.g. for 2.5 hours. The product, by vapor phase chromatography, showed the following analysis:

10.2% dimethyl-octanol, 72.5% citronellol and 17.3% geraniol and nerol.

A study of the foregoing examples clearly indicates the advantages to be gained by employing the process of the present invention. While the use of hydrogen alone leads to some hydrocarbon formation, these are easily removed from the citronellol. Also, hydrocarbon formation can be suppressed by adding a small amount of an alkali as shown in Example V, or by providing an alcohol as a source of at least a part of the hydrogen. The alcohol can be either a primary or secondary alcohol, and preferably is isopropanol when an alcohol is used as the sole source of hydrogen. However, other alcohols readily providing hydrogen under the conditions employed can be used, such as cyclohexanol and 2-butanol. Also use of higher temperatures when using molecular hydrogen reduces hydrocarbon formation as shown in Example V.

The composition of the geraniol/nerol mixture is not important other than that it is preferred that it be free of deleterious impurities. But the ratio of the two isomers is not significant to the process. As would be expected, geraniol, the trans-isomer, hydrogenates somewhat faster than the cis-isomer. Thus when using substantially pure geraniol the reaction will be complete sooner than when a substantial amount of nerol is present and caution suggests that in such cases the heating be stopped sooner in order to minimize secondary reactions. The two isomers are otherwise equivalents in the process.

The process thus leads to high yields of high-purity citronellol which is useful as a perfume ingredient. It also provides a synthetically prepared material in high yields which can be converted to organoleptically acceptable hydroxy citronellal by known methods. This hydroxy citronellal is also a very valuable perfume material.

Having described the invention, what is claimed is:

1. A process of selectively catalytically hydrogenating a dienol selected from the class consisting of geraniol, nerol, and mixtures thereof to produce predominantly citronellol, comprising:
   contacting said dienol in a closed system with copper chromite and a hydrogen-source selected from the group consisting essentially of molecular hydrogen, alkanols and cycloalkanols containing up to six carbon atoms, and mixtures of said hydrogen and said alkanols and said cycloalkanols,
   carrying out said hydrogenation at a temperature of about 150° C. to about 240° C. and at a pressure of about 60 p.s.i.g. to about 600 p.s.i.g., and
   stopping said hydrogenation prior to hydrogenating substantially all of the dienol.

2. The process of claim 1 in which the hydrogen is provided by a molar excess of isopropanol over the dienol.

3. The process of claim 2 in which the hydrogenation is carried out in the liquid phase at a temperature of about 180° C. to about 190° C. under at least autogenous pressures.

4. The process of claim 1 in which molecular hydrogen is employed as the source of hydrogenation and the temperature of the reaction is in the range of from about 190° C. to 240° C.

5. The process of claim 1 in which the catalyst is a barium-promoted copper chromite.

6. The process of claim 1 in which the hydrogenation is carried out in the liquid phase.

7. The process of claim 6 in which the liquid of said liquid phase is selected from the groups consisting of alkanols and cycloalkanols containing up to six carbon atoms wherein the carbon atom carrying the hydroxy group also carries a hydrogen atom.

References Cited

UNITED STATES PATENTS

| | | | |
|---|---|---|---|
| 2,066,496 | 1/1937 | Taylor | 260—596 X |
| 2,125,412 | 8/1938 | Arnold et al. | 252—468 X |
| 2,223,303 | 11/1940 | Lazier | 252—467 |
| 2,964,579 | 12/1960 | Kirsch et al. | |
| 2,992,278 | 7/1961 | Tedeschi | 260—642 |
| 3,275,696 | 9/1966 | Goldstein | 260—631.5 |

FOREIGN PATENTS

| | | |
|---|---|---|
| 1,209,252 | 3/1960 | France. |
| 1,316,192 | 12/1962 | France. |

OTHER REFERENCES

Pinder, The Chemistry of The Terpenes, Chapman and Hall, Ltd., London, 1960, p. 37.

LEON ZITVER, *Primary Examiner.*

H. MARS, *Assistant Examiner.*